April 22, 1952  G. H. TOMLINSON ET AL  2,593,503
METHOD OF RECOVERING HEAT AND CHEMICALS FROM THE
RESIDUAL LIQUOR RESULTING FROM THE DIGESTION
OF CELLULOSIC FIBROUS MATERIAL
Filed Jan. 10, 1946  3 Sheets-Sheet 1

Fig.1

George H. Tomlinson &
George H. Tomlinson II
INVENTORS

BY
ATTORNEY

April 22, 1952 G. H. TOMLINSON ET AL 2,593,503
METHOD OF RECOVERING HEAT AND CHEMICALS FROM THE
RESIDUAL LIQUOR RESULTING FROM THE DIGESTION
OF CELLULOSIC FIBROUS MATERIAL
Filed Jan. 10, 1946 3 Sheets-Sheet 2
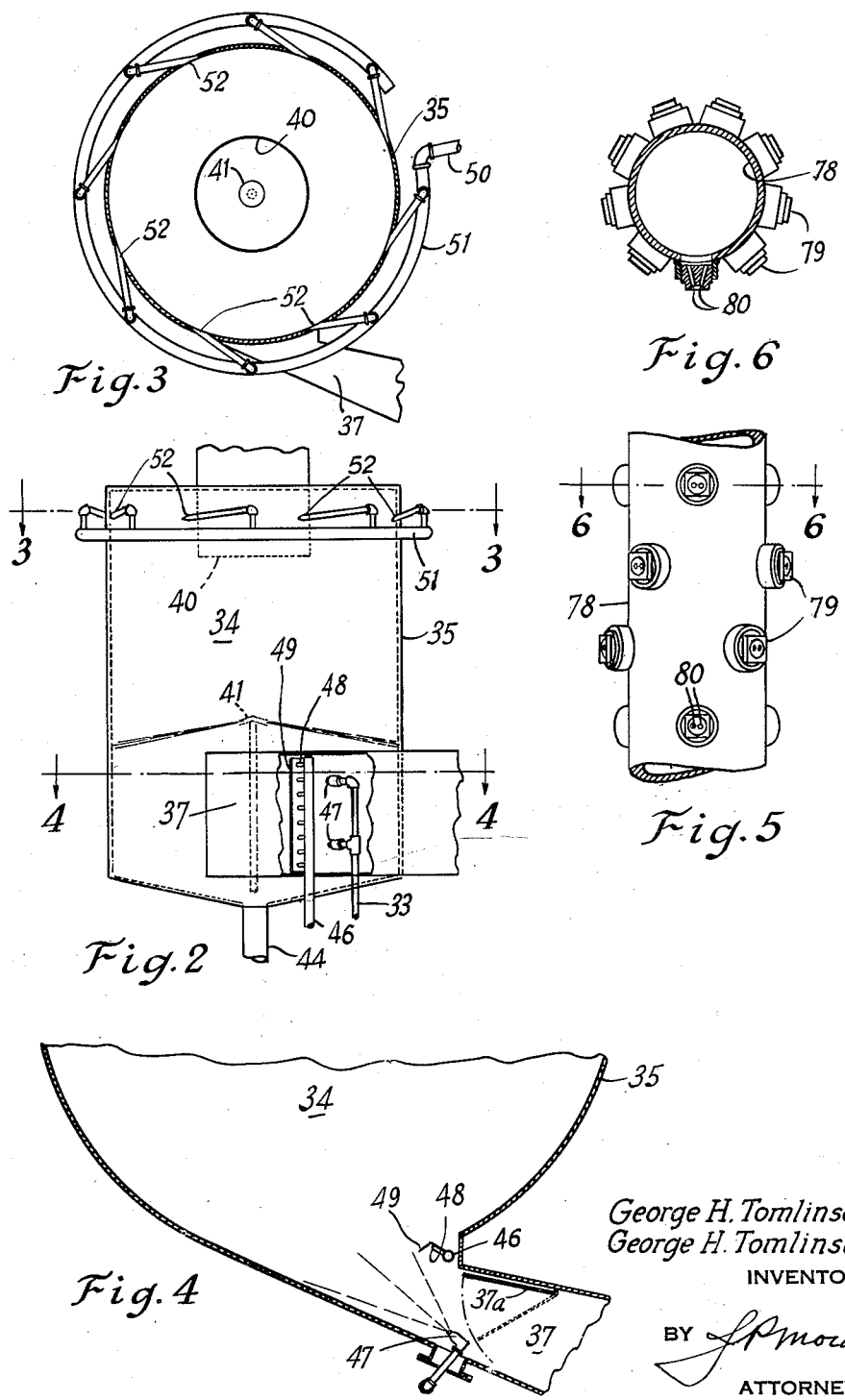
George H. Tomlinson &
George H. Tomlinson II
INVENTORS April 22, 1952 G. H. TOMLINSON ET AL 2,593,503
METHOD OF RECOVERING HEAT AND CHEMICALS FROM THE
RESIDUAL LIQUOR RESULTING FROM THE DIGESTION
OF CELLULOSIC FIBROUS MATERIAL
Filed Jan. 10, 1946 3 Sheets-Sheet 3

George H. Tomlinson &
George H. Tomlinson II
INVENTORS

BY
ATTORNEY

Patented Apr. 22, 1952

2,593,503

UNITED STATES PATENT OFFICE 2,593,503

METHOD OF RECOVERING HEAT AND CHEMICALS FROM THE RESIDUAL LIQUOR RESULTING FROM THE DIGESTION OF CELLULOSIC FIBROUS MATERIAL

George H. Tomlinson, Montreal, Quebec, and George H. Tomlinson, II, Cornwall, Ontario, Canada, assignors to Howard Smith Paper Mills, Limited, Montreal, Quebec, Canada, a company of Canada Application January 10, 1946, Serial No. 640,361

11 Claims. (Cl. 23—48)

The present invention relates to a method of and apparatus for the recovery of chemicals and heat from the flue gases discharged from a chemical recovery unit in which pulp residual liquor is incinerated, resulting in both economic advantages and the elimination of serious industrial nuisances.

In the recovery of chemicals from a pulp residual process liquid containing inorganic chemicals and combustible organic matter, such as, for example, the "black liquor" of the sulphate process of manufacturing paper pulp, the liquor is concentrated by evaporation to a solid concentration of 45–70% and its combustible constituents burned in a furnace to recover the included inorganic chemicals and to generate heat for absorption in associated heat exchange apparatus. The heat absorptive surface installed in the unit is customarily limited by economic factors to a recovery of the relatively high temperature potential heat in the combustion gases. As a result the temperature of the flue gases leaving the usual sulphate process chemical and heat recovery unit will be in the range of 400°–600° F. The gases thus contain a substantial amount of low temperature potential heat. In order to utilize a portion of this heat in the flue gases in concentrating the residual liquor prior to its incineration, the gases are usually subjected to direct contact with the liquor either in a spray tower or a disc evaporator. Although the thermal efficiency of the recovery process is substantially improved by such direct contact of hot flue gases with residual liquor, the heat recovery process has heretofore been limited to a reduction in flue gas temperature to a minimum of approximately 250° F. The total heat content of the gases leaving the direct contact liquor evaporator is essentially unchanged from that of their entering condition on account of their increased water vapor content, since sensible heat has been converted to latent heat, and none of this heat in the gases leaving the liquor evaporator, representing as it does about 35% of the heat generated in the furnace, is normally recovered. If the attempt is made to recover this heat, involving as it does cooling of the gases to a temperature essentially lower than 250 F., serious corrosion rapidly takes place in the metallic parts of the subsequent apparatus due to the presence of moisture and the content of sulphur-containing compounds in the gases, namely sulphur dioxide ($SO_2$), sulphur trioxide ($SO_3$), and hydrogen sulphide ($H_2S$). The presence of these corrosive sulphur constituents in the gases also represents an undesirable loss of sulphur from the cyclic recovery process.

Since the black liquor is strongly alkaline, it might appear that in the system heretofore used, the $SO_2$ and $SO_3$ could be readily absorbed by effecting a more intimate direct contact between the residual liquor and the hot flue gases by increasing the amount of liquor recirculated and the use of finer sprays. However, if this should be done with the conventional black liquor and in the equipment heretofore used, we have discovered that at least three serious disadvantages would result.

An excessive carry-over of black liquor spray droplets would occur which, upon contact with a surface away from the normal liquor stream, would carbonate with the formation of an insoluble lignin deposit. This deposit would dry out and any excessive temperature in this zone would carbonize this deposit with a resultant plugging of the equipment and the connecting ducts, necessitating frequent shut down of the equipment for the removal of such deposits. Spray particles that were not deposited on the walls of the equipment and which escaped to the atmosphere in the flue gas stream would not only represent a substantial chemical loss to the system but would also create a serious industrial nuisance.

The sulphate black liquor normally used in direct contact liquor evaporators, in addition to sodium hydroxide (NaOH), sodium carbonate ($Na_2CO_3$), etc. contains considerable quantities of sodium sulphide ($Na_2S$). Sodium sulphide, being the salt of a weak acid, tends to hydrolyze in aqueous solution. When such a solution is evaporated $H_2S$ tends to escape from the solution in the form of a gas even in the presence of excess NaOH, the reversible reaction being as follows:

(1) $Na_2S + 2H_2O \rightleftharpoons$ 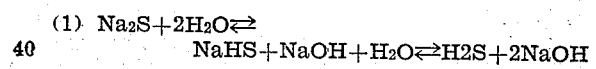
 $NaHS + NaOH + H_2O \rightleftharpoons H_2S + 2NaOH$ In addition to such loss due to evaporation, carbon dioxide ($CO_2$) present in the flue gases, being more strongly acidic than $H_2S$, will react with $Na_2S$ to release additional $H_2S$, this reaction being:

(2) 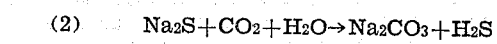 $Na_2S + CO_2 + H_2O \rightarrow Na_2CO_3 + H_2S$

Reaction 2 proceeds to a markedly increased extent as the liquor-gas contact conditions are improved. Thus in attempting to recover the sulphur in the form of $SO_2$ and $SO_3$ from the flue gases, and to obtain increased thermal recovery from the gases, increasing quantities of $H_2S$ would be lost with resulting odor problems and loss of sulphur from the system.

In addition to Na₂S, the residual liquor also contains small quantities of methyl mercaptan (CH₃SH), present as its sodium salt (CH₃SNa). This salt reacts with water and CO₂ in an analogous manner to Na₂S with the exception that CH₃SH is liberated rather than H₂S. Both gases have a particularly offensive odor, which creates an industrial nuisance. Such sulphur losses in the evaporating apparatus are not economically recoverable at the present time.

The conditions most favorable for absorption of SO₂ and SO₃, namely, a large liquid-gas interface, also favor the conversion of sensible heat to latent heat, so that in any attempt to accomplish the former result, the gases would be simultaneously cooled down until their vapor pressure was equal to that of the liquor, this being at a temperature of approximately 180–190° F. At such temperatures, which are very close to the dew point of the gases, extremely rapid corrosion of the metallic parts of subsequent apparatus would occur as a result of only trace quantities of sulphur oxide constituents in the gases, particularly in the presence of H₂S.

As disclosed in our companion application, Serial No. 640,360, filed January 10, 1946, we have found that the problem of black liquor entrainment in the gases leaving the direct contact liquor evaporator can be solved by passing these gases through a cyclonic separating zone, which may be subsequent to the direct contact liquor evaporating zone or preferably, combined therewith in a common cyclone vessel, into which a stream of flue gases is tangentially introduced and the gases, laden with liquor to be evaporated mixed therewith during or immediately subsequent to their introduction, are passed upwardly at a relatively high velocity through a helical path in intimate scrubbing contact with boundary walls continuously wetted with previously treated liquor to form a descending liquor film over the boundary walls. The centrifugal effect of the rotating gas stream in contact with the wetted wall surface is prolonged for a period sufficient for all of the entrained liquor particles to be deposited on the wet boundary walls before the gases are discharged from the separating zone. During the period of suspension in the gases and while in the descending liquor film, the intimate contact between the liquor particles and the surrounding or contacting hot gases causes the evaporation of a portion of their water content. This evaporating effect is substantially increased, while limiting the axial length of the evaporating and separating zone, by recycling the partly dehydrated liquor until a predetermined concentration is effected, at which concentration it is withdrawn. Advantageously, the liquor is continuously drained from the evaporating and separating zone to avoid the formation of a liquor pool in the bottom thereof.

The described evaporating effect is limited with the conventional sulphate black liquor by the necessity of avoiding a reduction in gas temperature below approximately 250° F., since excessive corrosion of subsequent equipment will occur with lower gas temperatures due to the presence of Na₂S in the liquor. It would therefore be necessary when operating with such a liquor, to use relatively coarse liquor sprays and to recycle the liquor only to a sufficient extent to cool the gases to this temperature. The maximum efficiency of the operation is unattainable under such conditions.

As disclosed in said companion application, we have found that the unstable sodium sulphide and the sodium salt of methyl mercaptan in the black liquor can be converted to reusable stable sodium sulphur compounds which will not release hydrogen sulphide during subsequent evaporation or carbonation of the liquor, by oxidizing the liquor under predetermined conditions suitable for a continuous industrial process. Our experiments have indicated that the reaction involved in the oxidation of sodium sulphide in sulphate black liquor involves the conversion of the sodium sulphide to thiosulphate, a more stable form for the sulphur, and to sodium hydroxide, and that oxidation with air can be readily and completely effected at a rapid rate, if predetermined pressure and temperature conditions are maintained. For example, we have found that optimum oxidizing conditions at atmospheric pressure require a temperature in the range of 140–180° F. and preferably at approximately 160° F. The oxygen absorption rate of this liquor tends to increase with increasing temperature, but at temperatures between about 160° F. and 180° F. the solubility of the oxygen of the air in the liquor and the lower partial pressure of the oxygen in the gas phase will tend to reduce the net oxygen absorption rate of the sulphate liquor. This tendency of reduced net oxygen absorption rate may be effectively offset by the use of higher air pressure in the oxidizing apparatus.

We have also found that the oxidation rate of the unstable sodium sulphur compounds is substantially increased by the presence of the sulphate process lignin, which appears to have a catalytic action. This catalytic property does not appear to be present in alkaline treated waste sulphite liquor. While various types of apparatus may be used for the oxidation operation, it is desirable to minimize the exposure of the lignin to oxidizing conditions where lignin recovery is contemplated.

In some alkaline processes, such as the soda process as normally practiced, the amount of sodium sulphide in the cooking liquor is sufficiently small that it is all converted to a stabilized form during the digestion process and it is therefore unnecessary to carry out the described oxidation operation as a separate step.

By stabilizing the liquor prior to evaporation in the multiple effect evaporator, we have found that sulphur losses in the evaporator units are substantially reduced. The partly concentrated oxidized liquor can then be subjected to the cyclonic evaporating and separating operation described, which can then be operated at its maximum thermal efficiency and the liquor withdrawn therefrom at a concentration suitable for incineration under self-sustaining combustion conditions. The final evaporation of the liquor is accomplished in the furnace of the recovery unit. With the conventional sulphate black liquor, considerable quantities of H₂S are liberated in the furnace in accordance with Reactions 1 and 2 supra. This H₂S is burned to SO₂ in the furnace and a substantial part of the SO₂ further oxidized to SO₃, particularly in the boiler tube zone where the temperature favors the conversion of SO₂ to SO₃. However when an oxidized liquor is incinerated, a greater proportion of the sulphur in the liquor will remain combined with the sodium during its incineration, reaching the furnace hearth where it is reduced by the carbon in the char bed to Na₂S, which is carried from the furnace in the smelt. Thus with oxidized black liquor, the flue gases will contain a lesser amount of gaseous sulphur oxides and such amount as may be present can be effectively recovered in direct contact with the liquor as described, without the formation of H2S.

The flue gases leaving the cyclonic evaporating and separating zone, having been effectively freed of their corrosive sulphur-containing gaseous constituents and their temperature substantially reduced, are now in a favorable condition for the recovery of sodium sulphate (Na2SO4) and the recovery of a substantial portion of their low potential heat content. The Na2SO4 exists in the flue gases from a sulphate liquor recovery furnace to a small extent as a coagulated dust swept from deposits on the boiler heating surface and to a much greater extent as a widely dispersed fume with the fume particles of sub-micron dimensions, resulting from volatilization of the sodium salts in the furnace. The removal of this fume from the flue gases is highly desirable, not only for the substantial value of the chemical, but also since it forms a considerable industrial nuisance when discharged from the stack. It has been found that the fume can be partly recovered by costly electrical precipitation apparatus, but due to the corrosive nature of the gases from the incineration of the conventional sulphate black liquor, it has been necessary to maintain gas temperatures over 250° F. in a dry type precipitator to allow removal of the collected sodium sulphate in a dry condition. Flushing type precipitators are impracticable under such corrosive conditions. Other methods of dry fume separation, such as by sedimentation by cyclonic action and by filtration through gas filters, have proved commercially impractical due to the small size of such fume particles.

It is known that fume particles can be recovered from a gas by condensing the water vapor content of the fume-laden gas in a chamber into which a low temperature cooling liquid is sprayed. As a practical matter, however, the quantity of sprayed liquid required to condense the water vapor content of the gas and thus bring down the fume particles therewith with a widely dispersed fume, such as the sodium sulphate fume herein, and the gas temperature level at which this must take place, would be such that the collected fume solution would be so dilute as to be of negligible commercial value and unless the gas is free of sulphur-containing gaseous constituents corrosion would occur in the apparatus at uneconomic rates.

The flue gases leaving the cyclonic evaporation and separating zone as described are free of their gaseous sulphur constituents. Due to the conversion of sensible heat to latent heat in this operation and the increased water vapor content of the flue gases leaving the cyclonic zone, the total heat content of the flue gases is substantially unchanged while passing through this zone. A large amount of low potential heat is thus available in these flue gases. Pulp mills can advantageously use large quantities of hot water for pulp washing, bleaching and the like, provided the water is not contaminated with corrosive sulphur constituents, such as H2S.

In accordance with our invention disclosed in our said companion application, substantially all of the sodium sulphate fume particles and a substantial portion of the low potential heat content of the flue gases leaving the cyclonic zone is recovered by passing the flue gases upwardly in direct and intimate countercurrent contact with a lower temperature cooling liquid. This intimate liquid-gas contact is maintained for a period sufficient to reduce the flue gas temperature substantially below the initial dew point, causing a major portion of the water vapor therein to condense and the cooling liquid to absorb the latent heat of evaporation of the condensing vapor. The condensing moisture forms droplets about nuclei of suspended fume particles, so that the entrained fume particles are carried downwardly with the condensed moisture and cooling liquid and collected at the bottom of the fume and heat recovery zone, while the flue gases at a low temperature and substantially freed of suspended moisture and fume particles pass to the stack. The collected chemicals are advantageously concentrated to a predetermined concentration suitable for addition to the concentrated black liquor in the cyclonic evaporating and separating zone by flash evaporating the fume solution and recycling the major portion of the cooled evaporated solution through the fume and heat recovery zone and the flash evaporator. The heat values in the flashed vapor are completely recovered in cooling water supplied to a barometric condenser associated with the flash chamber. In this way, a large amount of warm water (approx. 100° F.) uncontaminated by H2S or other chemicals in the process will be available for use.

While a high fume recovery efficiency is attainable with the water vapor condensation method described, the heat content of the flue gases is reduced thereby to an extent that any further heat recovery therefrom is uneconomic and the recovered heat potential is limited by the barometric condenser efficiency to a cooling water discharge temperature too low for many uses in the pulping system. In accordance with our present invention, the chemical and heat recovery system disclosed in our said companion application can be modified to attain an equivalent fume recovery efficiency without the condensation of water vapor in the flue gases, whereby the flue gases leaving the fume recovery section will be at substantially the same temperature as entering, permitting heat recovery in the form of a lesser amount of higher temperature water, i. e. hot water (150-170° F.) in contrast to warm water (100° F.).

We have found that the Na2SO4 fume can be effectively removed and recovered from the fume-laden flue gases leaving the evaporating and separating zone by deluging the gases, preferably while moving through a helical path, with an aqueous liquid, preferably a recycled solution of the recovered Na2SO4 fume, and subsequently adding the recovered chemicals when suitably concentrated to the residual liquid to be incinerated. Both the temperature and water vapor pressure of the gases and aqueous liquid will be essentially in equilibrium in the fume recovery zone. Under these conditions the flue gases will be in a completely saturated condition on entering and will normally leave the fume recovery zone in a saturated condition and at a temperature of approximately 170° F., so that the exiting gases will contain substantially the same total heat as entering. In this operation, the fume-laden flue gases are introduced into a fume recovery chamber of circular cross-section and passed through a helical flow path therein, the axis of the chamber being vertical or preferably horizontal. The whirling gas stream is subjected to a multiplicity of relatively coarse radial sprays of the aqueous liquid under sufficient pressure, e. g. 25 p. s. i., to insure a uniform, continuous and positive passage of a very large number of small liquid droplets through the gas stream. The sprayed particles have considerable momentum which carries them towards the chamber wall. Their course is deflected by the whirling gas stream which tends to spin the droplets about the axis of rotation of the stream. As the angular velocity of the droplets increases, centrifugal force carries the droplets through the gas stream to the chamber wall. As the droplets hit the chamber wall, their angular velocity is quickly lost due to the retarding effect of the liquid film on the wall, and the gravitational force becomes the major factor, and if the axis of the chamber be positioned vertically causing the liquid to run down the wall. With a horizontal arrangement, liquid droplets falling from the top section of the chamber are again swept up by the gas stream and broken up into smaller droplets, which are in turn thrown against the wall. This cycle may be repeated many times before the liquid is in a position to flow down the chamber wall to a draining point. Such alteration of the liquid droplets between centrifugal and gravitational fields results in an increased liquid-gas and therefore liquid-fume contact and so increases the efficiency of fume recovery per unit of liquid sprayed.

The concentration of the collected fume solution may be controlled at any desired value, e. g. 20% by weight, by the controlled addition of water to the system, the volume of deluge liquid in circulation being maintained at a constant value with a controlled overflow to the evaporating and separating section. A small quantity of soda ash or caustic may be added to the circulating liquid which on carbonation by the flue gases will maintain a bicarbonate buffering action on the liquid. Only a small quantity of alkali need ever be used for this purpose in view of the prior oxidizing treatment of the residual liquor and absorption of the gaseous sulphur oxides.

In view of the high concentration of the circulating fume solution, entrainment of spray particles in the gases leaving the fume recovery zone is minimized as much as possible and to insure elimination of any remaining liquid particles, the outgoing gases are passed through a cyclonic separating zone before reaching the final heat recovery section, the separated liquid being returned to the fume recovery zone. As the flue gases enter and leave the fume recovery zone in a saturated condition and at substantially the same temperature, their total heat content remains the same. The purified gases may therefore be passed counter-currently through a direct contact heat transfer apparatus in contact with a low temperature heat absorbing liquid, such as fresh water. The flue gases are cooled therein to a temperature approaching that of the entering heat absorbing liquid, and the liquid heated to a temperature (150–170° F.) approaching that of the entering gases. A substantial dehumification of the gases with a simultaneous recovery of a large portion of the heat content results. Substantial quantities of hot water free of corrosive sulphur constituents are thus made available at various points in the pulp mill which may be used for the pulp washers, bleachers and the like eliminating the use of direct steam at these points and increasing the thermal efficiency of the mill.

The main object of our invention is the provision of an improved method of and apparatus for recovering heat and chemicals from hot flue gases discharged from a chemical recovery unit in which pulp residual liquor is incinerated. A further and more specific object is the provision of an improved cyclic recovery system of the character described having a high thermal efficiency and low chemical losses, and particularly characterized by an increased degree of liquor concentration in direct contact liquor evaporating apparatus without the release of noxious gaseous sulphur constituents therein or the inclusion of gaseous sulphur oxides or residual liquor in the discharging flue gases, the recovery of substantially all of the sodium sulphate fume in the flue gases, and the production of substantial quantities of hot water uncontaminated by corrosive chemical constituents of the residual liquor. A further specific object is the provision of a cyclic recovery system of the character described having highly efficient heat and chemical recovery apparatus of simple and low cost construction and operation, low space requirements, ease of operation, and freedom from the necessity of frequent cleaning.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Of the drawings:

Fig. 1 is a schematic diagram of the flow sequence of a chemical and heat recovery system for sulphate pulp residual liquor incorporating the present invention;

Fig. 2 is an enlarged elevation, partly broken away, of the gas scrubber;

Fig. 3 is a horizontal section on the line 3—3 of Fig. 2;

Fig. 4 is a fragmentary horizontal section on the line 4—4 of Fig. 2;

Fig. 5 is an elevation of a portion of a spray header;

Fig. 6 is a section taken on the line 6—6 of Fig. 5;

Figure 8:
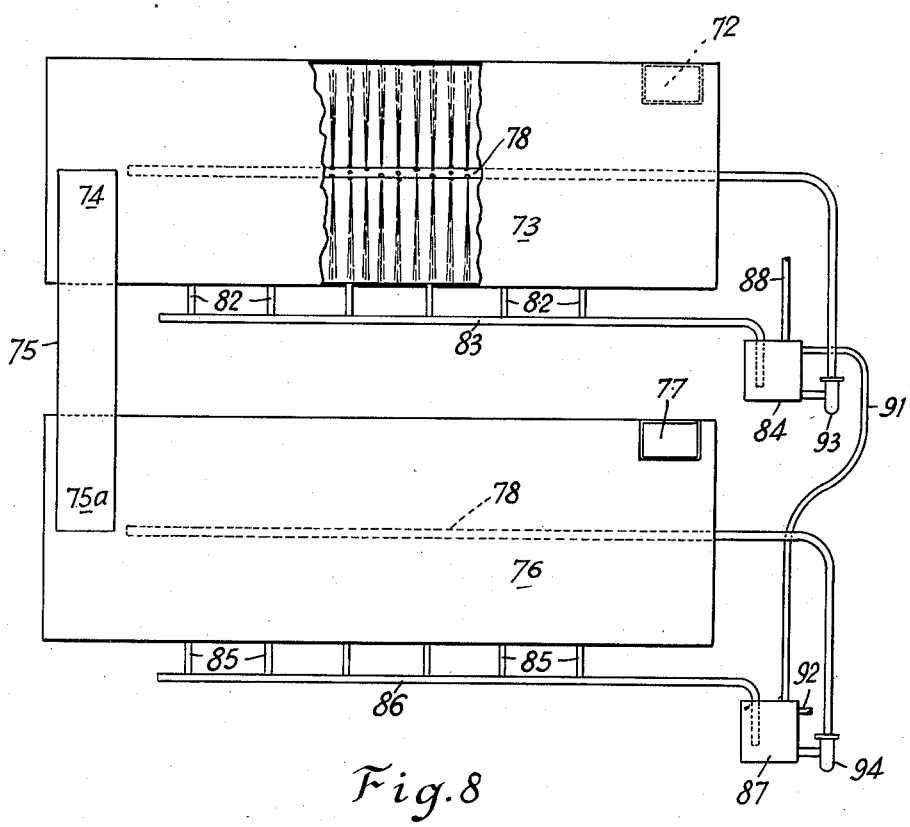
Fig. 8 is an elevation, partly broken away, of the fume recovery chambers.
Figure 7:
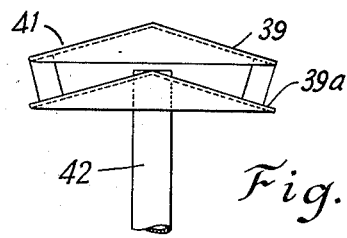
Fig. 7 is an enlarged elevation of one of the spraying devices shown in Fig. 2.

As indicated in the flow diagram, Fig. 1, the apparatus for carrying out the described cyclic recovery process, comprises digesters and a blow pit (not shown) from which pulp is passed to one or more pulp washers 10 where it is washed with hot water (150–160° F.) to remove residual chemicals and organic solids. From the washers, the pulp is transferred to treating and drying units (not shown) for processing into paper, while the residual or "black" liquor is withdrawn from the washers by a pump 11 and delivered to a weak liquor storage tank 12.

The weak liquor in the tank 12 has a solid concentration of 15–18% and is normally at a temperature approximating 160° F., which is especially suitable for oxidation of the unstable sulphur compounds in the liquor under atmospheric pressure conditions. The oxidation operation is advantageously carried out at this point, prior to any evaporation of the liquor, and due to the rapid oxidation of the sodium sulphide because of the catalytic properties of the lignin present in the liquor, it can be carried out in apparatus permitting a continuous relatively rapid flow of the liquor and air therethrough, such as a tower 14 packed with material having a high ratio of surface area to volume, such as Raschig rings, coke or the like.

As shown in Fig. 1, the oxidizing tower 14 receives weak liquor from the tank 12 through a pump 13 and supply pipe 15. An air inlet chamber 16 in the bottom of the tower receives a continuous supply of air from a forced draft fan 17. A central distribution trough 18 is positioned on the top of the tower to receive the liquor from the supply pipe 15 and continuously discharge it through overflow nozzles 18ª therein onto a secondary distributing plate 19 having uniformly distributed overflow nozzles 19ª through which the liquor flows onto the subjacent upper surface of the packing material. Pipes 19ᵇ in the plate 19 extend above the liquor level on the plate to permit the discharge of the air, the top of the tower being open or otherwise suitably ventilated. The packing may be a continuous charge or be carried on vertically spaced gratings 20 to the levels indicated in Fig. 1, providing an extensive wetting surface area for the liquor and a corresponding surface contact between the liquor trickling down through the tower packing and the ascending streams of air. Complete oxidation of the unstable sodium sulphur compounds in the liquor is normally effected during its passage. The tower has a liquor outlet pipe 22 at its lower end for the discharge of the oxidized liquor.

A pump 23 receives liquor from the outlet pipe 22 at a predetermined rate and discharges it into a pipe 24 having branch pipes 25 and 26 leading respectively to the primary distributing plate 18 at the top of the tower 14 and to the first effect of a multiple effect evaporator 27. The described piping arrangement permits a regulable portion of the liquor to be recirculated through the branch 25 and tower 14 for further exposure to the oxidizing effect of the air passing therethrough when the liquor being discharged is found to be insufficiently oxidized.

The evaporator effects 27 are arranged to concentrate the normally completely oxidized weak liquor delivered thereto, by the evaporation of moisture in a well known manner. Saturated steam used in the evaporator effects is supplied from the recovery unit boiler 30 through a connecting steam main 28. The liquor is concentrated in the evaporator to a solid concentration of 35–40% and delivered to a concentrated liquor storage tank 31, from which it is withdrawn as required by a pump 32 and delivered through a pipe 33 to a direct contact liquor and gas contact apparatus 34 for a further and substantial concentration of the liquor, the recovery of chemicals from the hot flue gases from the recovery unit, and the separation of the residual liquor entrained in the flue gases before leaving the apparatus.

As shown in Figs. 2–4 and 7, the evaporating and separating apparatus or gas scrubber 34 consists of a generally cylindrical body 35 provided with an inverted conical bottom and an inwardly tapering tangential inlet 37 opening into the lower portion of the cylindrical body 35. Flue gases, resulting from the combustion of a residual liquor of a predetermined solid concentration in the recovery furnace as hereinafter described, pass through a duct 38 under a positive pressure to enter the gas scrubber 34 at a relatively high velocity through the tangential inlet 37, thence flowing upwardly in a helical path along the chamber wall. An externally operable baffle 37ª controls the effective flow area of the inlet 37, and thereby the entering gas velocity, and is hinged at its outer end to the inner side of the duct to maintain a tangential gas entry into the scrubber chamber at all times. A flue gas outlet from the scrubber chamber is formed by a vertical duct 40 centrally located in the top of the chamber and having its open lower end at a level substantially below the top of the chamber, so that a substantial change in direction of flow of the gas stream is effected in the annular space surrounding the duct 40 before the gases exit from the chamber.

If the hot flue gases were to flow through the gas scrubber 34 at the same temperature (400–600° F.) as the gases leave the air heater, the gas temperature within the scrubber chamber would be too high for the optimum conditions for sulphur oxide absorption. Moreover, such high gas temperatures would tend to cause liquor to dry out and carbonize on any spraying devices in the scrubber chamber. Optimum temperature conditions for sulphur oxide absorption and protection of such spray nozzles from liquor carbonization are obtained by rapidly and substantially reducing the temperature of the entering flue gases. The provisions for this purpose include a plurality of vertically spaced spray nozzles 47 extending into the inlet duct 37 and arranged to discharge relatively coarse conical sprays of concentrated residual liquor from the pipe 33 towards and across the gas entrance area of the duct 37 into the scrubber chamber, as indicated in Fig. 4. A second series of vertically spaced spray nozzles 48 at the opposite side of the duct 37 receives another portion of this liquor through a branch pipe 46 and by means of one or more associated nozzle impact plates 49 discharges a substantially continuous sheet or curtain of the liquor across the entrance area of the duct 37. With the described arrangement of liquor nozzles, the flow of residual liquor to the nozzles 47 and 48 can be readily regulated to secure the desired reduction in temperature of the liquor-laden flue gases entering the gas scrubber 34, e. g. a scrubber gas temperature approaching 200° F.

A spraying device 41 is positioned axially of the lower part of the scrubber chamber superjacent the flue gas inlet 37 and arranged to receive a mixture of oxidized residual liquor, which has been previously sprayed into the gas scrubber, and a recovered fume solution, from a recirculation tank 43 through a pump 45 and a pipe 42 connected thereto. The tank 43 is connected to the bottom of the scrubber chamber by a drain pipe 44, so that liquor running down the walls of the scrubber chamber will collect in the tank without forming a pool in the bottom of the chamber. The spraying device 41 illustrated consists of a vertical discharge section of the pipe 42 on the upper end of which a pair of vertically spaced shallow conical plates 39 and 39ª are mounted, the discharging liquor impacting on the center section of the plate 39 and discharging as a relatively coarse spray over the entire circumference of the plate. The plates are so shaped that the spray discharges at a slightly downward angle across the path of the whirling ascending gas stream. The sprays from the spray devices 47, 48 and 41 are further subdivided by the whirling gases and an intimate mixture of the spray particles and gases in the chamber results, providing a large heat transfer contact area therebetween sufficient to effect the desired evaporation effect on the sprayed liquor. The gaseous sulphur oxides in the flue gases are simultaneously absorbed by the stabilized alkaline liquor sprays, so that the recovered sulphur can recombine with the liquor, increasing the total sulphur content of the liquor. If the nozzles 47 should be of sufficient capacity to handle all of the partly concentrated liquor from the tank 31, the spray nozzles 46 can advantageously be connected to the pipe 42 to receive recirculated liquor.

The intimate contact of the sprayed liquor with the entering flue gases thus not only substantially reduces the gas temperature and concentrates the liquor by the evaporation of included moisture, but also washes out as precipitate the entrained coagulated sodium sulphate dust in those gases. The cyclonic action and flow path of the liquor-laden gas stream in the gas scrubber tends to effect the substantially complete separation of the coagulated dust particles and sprayed liquor droplets from the flue gases and deposition on the chamber walls before the gases leave the scrubber. The gaseous sulphur oxides in the flue gases will be substantially completely absorbed in the scrubber by the sprayed liquor under these temperature and liquor-gas contact conditions.

The solid and liquor particles depositing on the scrubber chamber walls are continuously removed by maintaining a continuous film or sheet of recycled liquor downwardly over these surfaces. For this purpose, another portion of recycled liquor is delivered from the tank 43 through a pipe 50 to a horizontally disposed substantially annular header 51 exteriorly surrounding the upper portion of the gas scrubber. A series of tangentially arranged liquor spray nozzles 52 are symmetrically spaced circumferentially around the scrubber, entering the chamber intermediate the top of the chamber and the lower end of the duct 40. Each spray nozzle is connected with the header 51 and arranged to discharge liquor downwardly at a slight angle to the horizontal and sweeping the inside vertical wall of the scrubber 34. The sprays are directed in the same angular direction as the ascending whirling stream of liquor-laden gas, forming a descending film of liquor swept by the ascending gas stream. The descending liquor washes the interior wall surface of the scrubber and removes any solids that may deposit thereon. The resulting wet surface of the scrubber wall aids in the separation of liquor and solid particles from the whirling gas stream in the chamber. Separation of any remaining dust and liquor particles in suspension tends to occur on the change in direction of the gases in the annular space surrounding the duct 40. With the described gas scrubber construction and operation, mechanical carryover of black liquor in the gases therefrom was found to be eliminated. There was no evidence that any carbonization of the black liquor had occurred, and at the same time carbonation was insufficient to cause lignin precipitation. The temperature of the gases leaving the scrubber can be readily maintained at its equilibrium value, usually 180–190° F., by adjusting the volume of recirculated liquor delivered to the spraying device 41 and nozzles 52. A substantial concentration of the liquor was effected, the solid concentration of the partly concentrated residual liquor leaving the multiple effect evaporator 27 at about 35–40% being raised to about 55% in the gas scrubber, for example.

The tank 43 is preferably constructed of a suitably large size so that rapid changes in the Baumé of the liquor collected therein are not likely to occur. Since this pool of collected liquor is located below the lower portion of the scrubber 34 and in communication therewith only through a relatively small diameter connection any failure of liquor supply, such as by reason of a power failure, will not result in a drying or charring of any large quantity of liquor by exposure to the heat of the entering flue gases.

A branch 55 of the pipe 50 directs the flow of a predetermined quantity of liquor to a mixing tank 56 wherein salt cake may be added, if desired, to the liquor preparatory to the use of the liquor as a fuel in a recovery furnace 57 of the general type shown in U. S. Patent 2,161,110. The liquor is withdrawn from the tank 56 by a pump 59 and delivered through a feed pipe 60 to an oscillatable liquor spray nozzle 61 situated in a wall 62 of the furnace 57. Preferably, the pipe 60 is provided with an extension 63 beyond the spray nozzle take off and located so as to return excess liquor to the mixing tank 56. By continuously circulating excess liquor, the pipes 60 and 63 will be kept clean.

The spray nozzle 61 is simultaneously oscillated in two planes of movement so as to deposit successive films of liquor upon the side and rear walls of the furnace 57. As the liquor deposit builds up in successive layers upon the walls, it is dried by the heat of the furnace and the char so formed will break off in lumps due to the effect of gravity thereon. These lumps fall onto a sloping hearth 64 at the bottom of the furnace 57 where the combustible matter is burned off by the introduction of preheated air streams. The residue of the char largely consists of inorganic chemicals which are converted to a liquid or semi-liquid smelt containing sodium carbonate and sulphide. The smelt flows through a spout 65 at the lower end of the hearth 64 and is deposited in a tank 66 wherein it is dissolved by a wash solution for causticizing, thereafter being pumped to the causticizing portion of the process (not shown) for treatment and subsequent reuse in the pulp digesters, the digestion reagents being sodium hydroxide and sodium sulphide. In accordance with our present invention, soda ash may be added to the green liquor or caustic to the white liquor as a portion of the make-up chemical.

The high grade heat generated by the combustion of the liquor is absorbed from the gases of combustion by a series of heat absorptive surfaces, such as the tubes of the boiler 36 shown in Fig. 1. The cooled gases leaving the boiler are passed through a tubular air heater 67 wherein air, delivered by the forced draft fan 68, is heated in its passage through the heater 67 and passed to various sets of air ports in the furnace for use as combustion air. The flue gases drawn through the heater 67 are delivered to the duct 38 by the induced draft fan 70. The flue gases, with entrained solids and gaseous chemicals then pass to the scrubber 34 as previously described.

A substantial amount of $Na_2SO_4$ fume remains in suspension in the flue gases leaving by the outlet duct 48. The recovery of this fume from the flue gases is highly desirable, not only by reason of its value as a chemical in the process, but also due to the industrial nuisance entailed by its discharge through the stack to the atmosphere. In accordance with the present invention, this fume can be effectively recovered without substantially changing the heat content of the entering flue gases, by deluging the flue gases, preferably while moving through a helical path, with a heated aqueous liquid, which preferably consists of a recycled aqueous solution of the recovered fume. This operation can be effectively accomplished in one or more cylindrical chambers equipped with tangential gas inlets and outlets. The aqueous solution is sprayed into the whirling gas stream through a multiplicity of spray nozzles arranged to discharge from points along the longitudinal axis of the chamber throughout an angle of 360° towards the circular peripheral wall of the cylinder, thereby insuring a substantially uniform and continuous passage of a large number of liquid droplets through the gas stream. The longitudinal axis of the chamber may be in any position between the vertical and a horizontal position without appreciably effecting the efficiency of the fume recovery. However, a horizontal position of the longitudinal axis of the chamber is preferable from the standpoint of pump power in recirculating the aqueous solution therethrough and for other reasons hereinafter described.

A preferred arrangement of the apparatus is shown in Figs. 1 and 8 wherein the flue gases from the scrubber 34 are passed through the duct 40 to a tangential gas inlet 72 adjacent one end of a cylindrical fume recovery chamber 73. The entering gases flow in a helical path along the cylindrical wall of the chamber 73 and pass therefrom through a tangential outlet 74 adjacent the opposite end of the chamber. From the outlet 74 the gases pass through a duct 75 to the tangential inlet 75a of a second fume recovery chamber 76 which substantially duplicates the chamber 73. The gases in flowing through the chamber 76 pass in a helical path along the cylindrical wall thereof leaving through a tangential outlet 77 adjacent the opposite end of the chamber 76.

Each of the chambers 73 and 76 is provided with a liquid distributing header 78, coaxial with the longitudinal axis of each chamber and each header is provided with a multiplicity of spray nozzles 79. An enlarged view of the spray header 78 is shown in Figs. 5 and 6 and includes rings of spray nozzles 79, each ring having three nozzles angularly spaced at 120° with the nozzles in adjacent rings staggered at 40° and in the same angular direction from the corresponding nozzle above. Each nozzle 79 has a pair of spaced orifices 80 angularly arranged to discharge converging liquid jets impinging on one another immediately on their discharge to disintegrate each pair of relatively coarse jets into a finely divided spray. For example, the orifices 80 may be ¼ in. diameter for a liquid discharge pressure of approximately 25 p. s. i. The headers 78 have their nozzle section extending substantially the full axial distance between the adjacent sides of the gas inlets and outlets, a space being provided at the discharge end of each chamber free of sprays for the centrifugal separation of liquid from the whirling gas stream. Liquid accumulating in the bottom of the chamber 73 is withdrawn through longitudinally spaced drain pipes 82 to a collecting pipe 83 and delivered to a liquid receiving tank 84. Rapid liquid removal will avoid the formation of any liquid pool in the bottom of the chamber 73 which might have a tendency to interfere with the cyclonic movement of the gas stream through the chamber. In a similar manner liquid reaching the bottom of chamber 76 is withdrawn through the drain pipes 85 and collecting pipe 86 and delivered to a tank 87.

In the arrangement shown in the drawings, make-up water is added to the tank 84 through the pipe 88, and an overflow pipe 91 connects the tank 84 with the tank 87 to provide a means for the removal of excess liquid from the tank 84 to the tank 87. The tank 87 is further provided with an overflow pipe 92 which will direct the flow of liquid to the liquor reservoir 43 adjacent the scrubber 34.

The nozzles in the header 78 within the chamber 73 receive a substantially uniform flow of liquid at a pressure of approximately 25 p. s. i., or greater, from the tank 84, as delivered thereto by a pump 93. The use of such liquid pressures with spray nozzles of the character described assures an adequate atomization of that liquid and assists in obtaining a high fume recovery within the deluge chamber. In a similar manner, the chamber 76 receives liquid from the tank 87 as delivered by a pump 94.

As the liquid droplets leave the nozzles of the header 78, they are carried radially toward the chamber wall with an initial momentum sufficient for substantially all of the droplets to reach the wall. However, their course is deflected by the rapidly traveling cyclonic gas stream which tends to spin the droplets about the axis of the chamber. The original momentum of the droplets and the centrifugal effect of the whirling gas stream carry the droplets through the gas stream to the wall of the chamber, with little gravitational effect thereon. As the minute droplets of liquid pass through the gas stream with its much more minute particles of fume in suspension therein, the liquid particles pick up the much smaller fume particles during their passage and carry them along in solution. As the liquid droplets hit the chamber wall, their tangential motion is quickly lost due to the retarding effect of the liquid film, and the gravitational force becomes the major factor in directing their movement. When the axis of the chamber is horizontal, as shown, liquid particles striking upon the upper portion of the chamber wall tend to fall back into the rotating gas stream where they are broken into smaller droplets which are caught in the whirling gas stream and again thrown out by centrifugal force, striking the wall a second time. This action will be continued until the individual droplets of liquid strike the lower portion of the chamber wall and discharge from the chamber through the drain pipes. This action between the gas and liquid assures an intimate liquid-gas and liquid-fume contact and effectively removes substantially all of the fume present in the flue gases. In the operation of the deluge chambers, the concentration of the liquid solution may be regulated to any desired value by controlling the additional amounts of make-up water through the pipe 88.

Since the circulating liquid will contain a relatively high concentration of sodium sulphate, the entrainment of spray particles in the flue gas leaving the fume recovery system should be avoided. This may be accomplished in several ways and in the preferred embodiment of the invention this is accomplished by a cyclone separator 95. The efficiency of such a separator will be high and the removal of droplets from the gases effective when the diameter of the separator is relatively small to promote high gas velocities therethrough. The collected liquid from the separator 95 is returned to the tank 87 by the pipe 96 therebetween.

The flue gases which have been freed of their sulphur-containing gases in the gas scrubber 34 and of 90–98% of the fume in the deluge chambers 73 and 76 are advantageously passed to a heat recovery tower 97, as shown in Fig. 1. The flue gases passing to the tower 97 contain a considerable amount of heat due to the latent heat of the water vapor present in the gases as a result of the evaporation of the water in the residual liquor in the recovery furnace and combustion of the combined hydrogen contained in the included organic matter. The latent heat leaving the furnace together with the sensible heat in the gases unabsorbed by the heat absorbing surface of the boiler and air heater passes to the cyclone evaporator 34 where most of the sensible heat is converted to latent heat, but without materially changing the total heat content of the flue gases. Only a negligible portion of this heat is given up in the deluge recovery chambers, i. e. the amount required for heating the water added for solution of the recovered sodium sulphate fume. Thus substantially all of the heat in the flue gases leaving the air heater 67 is present in the gases entering the tower 97.

The tower 97 may be a grid packed tower, as shown, or the like, through which the gas is passed in direct counter-current relationship with a stream of fresh cold water. In such a tower the flue gases leaving the separator 95 are passed through a duct 98 to a gas inlet 100 in the lower portion of the tower. As shown in Fig. 1, the tower 97 is of generally cylindrical shape and is provided with a substantially flat bottom section having a water outlet 101 at one side thereof and is provided with a gas outlet 102 in its top cover plate 103 leading to a stack (not shown). A horizontally disposed series of spray nozzles 104 are located in the upper portion of the tower at a spaced position below the gas outlet 102 and are arranged to direct sprays of cooling water received from a supply pipe 105 downwardly counter-current to the ascending flue gases. As shown, the tower is provided with a series of horizontally spaced, substantially vertical wooden plates 106 extending across the interior of the tower. A similar series of wooden plates is positioned below the upper adjacent series with the horizontal axes of the lower plates normal to those of the upper plates. The separate series of wooden plates are placed in a tier, one upon the other, with the plates of each series normal to those in the series immediately below and extending from an upper level spaced beneath the spray nozzles 104 to a lower level immediately above the gas inlet 100. Suitable valves and dampers (not shown) are incorporated in the described piping and ducts to control the fluid flow therethrough.

Nearly all of the low temperature potential heat in the gases leaving the boiler is recovered in the tower 97 by transferring the latent heat of the moisture in those gases through condensation thereof, to the cooling water. The quantity of heat recovered in the heat recovery tower 97 is very considerable, being equivalent to approximately 5000 lbs. of steam per ton of pulp, i. e. about 45–50% of the steam generated in the recovery furnace boiler. Since the gases entering the tower are not contaminated, the hot water delivered therefrom is non-corrosive and at a sufficiently high temperature (150–170° F.) that it may be advantageously used in the pulp mill for pulp washing, bleaching and the like.

As a result of the described process, the flue gases leaving the tower 97 for the stack are of an entirely different character than those normally discharged from a sulphate recovery furnace. Without the operating steps of this process, the flue gases leaving the stack form a billowing plume which depending on atmospheric conditions may carry to a considerable distance from the mill or settle on the surrounding territory. Sodium sulphate fume forms a relatively stable fog on dilution with the atmosphere, which together with the odor, is especially obnoxious. In contrast the stack gases from the present system form only a negligible plume which breaks up as it leaves the stack and is rapidly dissipated.

The chemical recovery system described will modify and greatly reduce the amount of chemicals required in the pulping process to maintain the proper concentration of solution. One example of the advantageous chemical effects of the present invention upon the operation of a sulphate paper pulp mill, is the following: If the usual sodium sulphate loss in the flue gases of an average pulp mill is 150 pounds per ton of pulp, the recovery system of the present invention will reduce this loss to approximately 8 pounds of sodium sulphate per ton of pulp, leaving a net saving of 142 pounds per ton in the amount of make-up. If this same mill is operating at 30% sulphidity and normally requires approximately 125 pounds of sodium sulphate as make-up for losses such as at the washers and in causticizing, the use of the present invention will allow the substitution of approximately 50% of the sodium sulphate by an equivalent amount of soda ash or caustic. The equivalent ratio of $Na_2O$ to sulphur in the sodium sulphate is 1 to 1 while that in the cooking liquor of the 30% sulphidity example above would be 1 to 0.3. Because of the sulphur loss heretofore common in a pulp mill without an equivalent loss of $Na_2O$, it has been necessary to add $Na_2O$ and sulphur in the ratio of 1 to 1 in order to maintain a ratio of 1 to 0.3 in the system. By the process described, the $Na_2O$ to sulphur ratio in the make-up may be adjusted to a value approximating that carried in the system. The same pulp mill requiring 275 pounds of make-up sodium sulphate per ton of pulp, would in using the present invention reduce these make-up requirements to approximately 58 pounds of sodium sulphate and approximately 42.5 pounds of sodium hydroxide per ton of pulp. In the event it is desired to carry a higher sulphidity than that normally employed, the make-up ratio may be modified accordingly. The described savings are substantial and when obtained in addition to the substantial elimination of the noxious gas and dust nuisance, of considerable commercial advantage.

While in accordance with the provisions of the statutes we have illustrated and described herein a preferred embodiment of the invention, those skilled in the art will understand that changes may be made in the method of operation and form of the apparatus disclosed without departing from the spirit of the invention covered by our claims, and that certain features of the invention may sometimes be used to advantage without a corresponding use of other features. For example, if a less efficient form of direct contact liquor evaporator be employed, resulting in a small amount of gaseous sulphur oxides being present in the gases entering the fume recovery chamber 73, recovery of these oxides can be effected in the chamber by adding caustic or soda ash to the recycled liquid in amounts sufficient to maintain the liquid in a buffered condition.

We claim:

1. The method of recovering heat and chemicals from the residual liquor resulting from the digestion of cellulosic fibrous material in a cooking liquor which comprises concentrating the residual liquor and absorbing gaseous sulphur oxides therein by the direct intimate contact of the residual liquor with hot flue gases containing gaseous sulphur oxides and chemical fume particles, separating the residual liquor from the flue gases, passing the flue gases after separating the residual liquor therefrom in a helical flow path through a fume recovery zone in intimate contact with a plurality of finely divided streams of aqueous liquid at substantially the temperature of the flue gases entering the fume recovery zone for the recovery of chemical fume from the flue gases, adding make-up water to said aqueous liquid, concentrating the aqueous liquid by recirculation through said fume recovery zone, and regulating the concentration of the recirculated aqueous liquid by a controlled dilution thereof.

2. The method of recovering heat and chemicals from the residual liquor resulting from the digestion of cellulosic fibrous material in a cooking liquor which comprises concentrating the residual liquor and absorbing gaseous sulphur oxides therein by the direct intimate contact of the residual liquor with hot flue gases containing gaseous sulphur oxides and chemical fume particles, separating substantially all of the residual liquor from the flue gases, passing the flue gases after separating tthe residual liquor therefrom in a high velocity stream through a helical path in a fume recovery chamber in intimate contact with a finely divided aqueous liquid in a multiplicity of radially projecting sprays flowing across said flue gas stream for the recovery of the chemical fume from the flue gases, maintaining temperature conditions in the fume recovery chamber sufficient to avoid condensation of water vapor included in the flue gases, adding make-up water to said aqueous liquid, mixing the aqueous liquid and recovered fume with the residual liquor, and recovering heat from the flue gases leaving the fume recovery chamber.

3. The method of recovering heat and chemicals from the residual liquor resulting from the digestion of cellulosic fibrous material in a cooking liquor which comprises concentrating the residual liquor and absorbing gaseous sulphur oxides therein by the direct intimate contact of the residual liquor with hot flue gases containing gaseous sulphur oxides and chemical fume particles, separating substantially all of the residual liquor from the flue gases, passing the flue gases after separating the residual liquor therefrom in a high velocity stream through a helical path in a fume recovery chamber in intimate contact with a finely divided aqueous liquid in a multiplicity of radially projecting sprays flowing across said flue gas stream for the recovery of the chemical fume from the flue gases, adding make-up water to said aqueous liquid, maintaining temperature conditions in the fume recovery chamber sufficient to avoid condensation of water vapor included in the flue gases, concentrating the aqueous liquid by recirculation through said fume recovery zone, regulating the concentration of said aqueous liquid by the controlled dilution thereof, mixing the concentrated aqueous liquid with the residual liquor, and recovering heat from the flue gases leaving the fume recovery chamber.

4. The method of recovering heat and chemicals from the residual liquor resulting from the digestion of cellulosic fibrous material in a sodium base alkaline cooking liquor which comprises concentrating the residual liquor by multiple effect evaporation, further concentrating the partly concentrated residual liquor and absorbing gaseous sulphur oxides therein by the direct intimate contact of the partly concentrated residual liquor with hot flue gases containing gaseous sulphur oxides and a sodium sulphate fume, separating substantially all of the residual liquor from the flue gases, passing the flue gases after separating the residual liquor therefrom in a high velocity stream through a helical path in a fume recovery chamber in intimate contact with a finely divided aqueous liquid in a multiplicity of radially projecting sprays flowing across said flue gas stream for the recovery of sodium sulphate fume from the flue gases, maintaining temperature conditions in the fume recovery chamber sufficient to avoid condensation of water vapor included in the flue gases, concentrating the aqueous liquid by recirculation through said fume recovery zone, regulating the concentration of said aqueous liquid by the controlled dilution thereof, mixing the concentrated aqueous liquid with the residual liquor, and recovering heat from the flue gases leaving the fume recovery chamber by direct contact with a heat absorbing liquid.

5. The method of recovering heat and chemicals from the residual liquor resulting from the digestion of cellulosic fibrous material in a cooking liquor which comprises concentrating the residual liquor and absorbing gaseous sulphur oxides therein by the direct intimate contact of the partly concentrated residual liquor with hot flue gases containing gaseous sulphur oxides and chemical fume particles, separating substantially all of the residual liquor from the flue gases, passing the flue gases after separating the residual liquor therefrom in a high velocity stream through a helical path in a fume recovery chamber in intimate contact with a finely divided aqueous liquid in a multiplicity of radially projecting sprays flowing across said flue gas stream for the recovery of sodium sulphate fume from the flue gases, adding make-up water to said aqueous liquid, maintaining temperature conditions in the fume recovery chamber sufficient to avoid condensation of water vapor included in the flue gases, concentrating the aqueous liquid, mixing the concentrated aqueous liquid with the residual liquor, recovering heat from the flue gases leaving the fume recovery chamber by direct contact with water, and utilizing the resulting hot water for washing the digested cellulosic fibrous material.

6. The method of recovering heat and chemicals from the residual liquor resulting from the digestion of cellulosic fibrous material in a sulphide-containing sodium base alkaline cooking liquor which comprises oxidizing the residual liquor without combustion in an oxidizing zone by intimate contact with air to stabilize unstabilized sodium-sulphur compounds therein against the evolution of noxious gases on further heating, concentrating the oxidized residual liquor by multiple effect evaporation, further concentrating the partly concentrated oxidized residual liquor and absorbing gaseous sulphur oxides by the direct intimate contact of the partly concentrated oxidized residual liquor with hot flue gases containing gaseous sulphur oxides and chemical fume particles, centrifugally separating oxidized residual liquor from the flue gases, passing the flue gases after centrifugally separating the oxidized residual liquor therefrom through a fume recovery zone into intimate contact with an aqueous liquid at substantially the same temperature as the flue gases entering the fume recovery zone for the recovery of a chemical fume from the flue gases without substantial change in the heat content thereof, concentrating the aqueous liquid by recirculation through said fume recovery zone, adding make-up water to said recirculated aqueous liquid, adding the concentrated aqueous liquid to the oxidized residual liquor, absorbing heat from the flue gases leaving the fume recovery zone by direct contact with water, and utilizing the resulting hot water for treating the the digested cellulosic fibrous material.

7. The method of recovering heat and chemicals from the residual liquor resulting from the digestion of cellulosic fibrous material in a sulphide-containing sodium base alkaline cooking liquor which comprises oxidizing the residual liquor without combustion in an oxidizing zone by intimate contact with air to stabilize unstabilized sodium-sulphur compounds therein against the evolution of noxious gases on further heating, concentrating the oxidized residual liquor by multiple effect evaporation, further concentrating the partly concentrated oxidized residual liquor and absorbing gaseous sulphur oxides by the direct intimate contact of the partly concentrated oxidized residual liquor with hot flue gases containing gaseous sulphur oxides and sodium sulphate fume, centrifugally separating oxidized residual liquor from the flue gases, passing the flue gases and included water vapor after centrifugally separating the oxidized residual liquor therefrom through a fume recovery zone in intimate contact with an aqueous liquid under heat transfer conditions sufficient to avoid condensation of included water vapor in the flue gases, adding make-up water to said aqueous liquid, adding the aqueous liquid and absorbed fume to the oxidized residual liquor before the incineration thereof, incinerating the further concentrated oxidized residual liquor to recover heat and chemicals therefrom and to produce said hot flue gases, absorbing heat from the flue gases leaving the fume recovery zone by direct contact with water, and utilizing the resulting hot water for washing the digested cellulosic fibrous material.

8. The method of recovering heat and chemicals from the residual liquor resulting from the digestion of cellulosic fibrous material in a cooking liquor which comprises concentrating the residual liquor by a direct intimate contact of the residual liquor with hot flue gases containing chemical fume particles, passing the flue gases through a deluge fume recovery zone in a helical flow path in intimate contact with a finely divided radially projected sprayed liquid at substantially the same temperature as the entering gases, whereby the temperature of said flue gases entering and leaving said fume recovery zone is maintained substantially the same, adding make-up water to said liquid, collecting the recovered fume in a liquid solution, and recirculating a major portion of said fume containing liquid solution through said fume recovery zone.

9. The method of recovering heat and chemicals from the residual liquor resulting from the digestion of cellulosic fibrous material in a cooking liquor which comprises concentrating the residual liquor by a direct intimate contact of the residual liquor with hot flue gases containing chemical fume particles, passing the flue gases through a deluge fume recovery zone in a helical flow path in intimate contact with a finely divided radially projected sprayed liquid at substantially the same temperature as the entering gases, whereby the temperature of said flue gases entering and leaving said fume recovery zone is maintained substantially the same, adding make-up water to said liquid subjecting the flue gases leaving said fume recovery zone to a cyclonic motion to separate solid and liquid materials therefrom, collecting the recovered fume in a liquid solution, and recirculating a major portion of said fume containing liquid solution through said fume recovery zone.

10. The method of recovering heat and chemicals from the residual liquor resulting from the digestion of cellulosic fibrous material in a cooking liquor which comprises concentrating the residual liquor by a direct intimate contact of the residual liquor with hot flue gases containing chemical fume particles, centrifugally separating the residual liquor entrained in the flue gases, passing the flue gases with a water vapor content approaching saturation after centrifugally separating the residual liquor therefrom in a helical flow path through a fume recovery zone and recovering the fume therein by intimate contact with an aqueous liquid sprayed across said gas flow path at substantially the temperature of the flue gases entering the fume recovery zone to recover the fume without substantial change in the flue gas heat and water vapor content, adding make-up water to said aqueous liquid, withdrawing the recovered fume from the fume recovery zone in an aqueous liquid, mixing the aqueous liquid with the residual liquor, and recovering latent heat by cooling the flue gases leaving the fume recovery zone below water vapor condensation temperature by direct contact heat exchange with fresh cooling water.

11. The method of recovering heat and chemicals from the residual liquor resulting from the digestion of cellulosic fibrous material in an alkaline cooking liquor which comprises concentrating the residual liquor and absorbing gaseous sulphur oxides therein by a direct intimate contact of the residual liquor with hot flue gases containing gaseous sulphur oxides and chemical fume particles, separating the entrained residual liquor from the flue gases, passing the flue gases with a water vapor content approaching saturation after separating substantially all of the entrained residual liquor therefrom through a fume recovery zone in a helical flow path and in intimate contact with a finely divided aqueous liquid projected across said gas flow path at substantially the temperature of the flue gases entering the fume recovery zone to recover the fume without substantial change in the flue gas heat and water vapor content, adding make-up water to said aqueous liquid, withdrawing the recovered fume from the fume recovery zone in an aqueous liquid, concentrating the aqueous liquid containing the recovered fume, mixing the concentrated aqueous liquid with the residual liquor before incineration thereof, incinerating the concentrated residual liquor to recover inorganic chemicals therefrom and to generate hot flue gases containing gaseous sulphur oxides and a chemical fume, and recovering latent heat by cooling the flue gases leaving the fume recovery zone below water vapor condensation temperature by direct contact heat exchange with fresh cooling water.

GEORGE H. TOMLINSON.
GEORGE H. TOMLINSON, II.

REFERENCES CITED

The following references are of record in the file of this patent:

UNITED STATES PATENTS

| Number | Name | Date |
|---|---|---|
| 355,291 | Anderson | Jan. 4, 1887 |
| 824,092 | Brunck | June 26, 1906 |
| 2,056,266 | Goodell | Oct. 6, 1936 |